(12) United States Patent
Waniguchi et al.

(10) Patent No.: US 10,939,066 B2
(45) Date of Patent: *Mar. 2, 2021

(54) WEARABLE CAMERA SYSTEM AND RECORDING CONTROL METHOD

(71) Applicant: Panasonic i-PRO Sensing Solutions Co., Ltd., Fukuoka (JP)

(72) Inventors: Kazuya Waniguchi, Fukuoka (JP); Minoru Hagio, Fukuoka (JP)

(73) Assignee: Panasonic I-PRO Sensing Solutions Co., Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,061

(22) Filed: Nov. 14, 2018

(65) Prior Publication Data

US 2019/0082137 A1    Mar. 14, 2019

Related U.S. Application Data

(63) Continuation of application No. 15/724,096, filed on Oct. 3, 2017, now Pat. No. 10,165,221, which is a continuation of application No. 15/261,290, filed on Sep. 9, 2016, now Pat. No. 9,819,896.

(30) Foreign Application Priority Data

Sep. 17, 2015 (JP) ................................. 2015-183954

(51) Int. Cl.
| | |
|---|---|
| *H04N 5/77* | (2006.01) |
| *H04N 21/2743* | (2011.01) |
| *H04N 21/422* | (2011.01) |
| *H04N 21/4223* | (2011.01) |
| *H04N 21/6543* | (2011.01) |
| *H04N 5/232* | (2006.01) |
| *H04N 9/802* | (2006.01) |
| *H04N 5/225* | (2006.01) |

(52) U.S. Cl.
CPC ........... *H04N 5/77* (2013.01); *H04N 5/23206* (2013.01); *H04N 9/802* (2013.01); *H04N 21/2743* (2013.01); *H04N 21/4223* (2013.01); *H04N 21/42203* (2013.01); *H04N 21/6543* (2013.01); *H04N 5/2251* (2013.01)

(58) Field of Classification Search
USPC .................................................. 386/224–228
See application file for complete search history.

(56) References Cited

U.S. PATENT DOCUMENTS

| | | | |
|---|---|---|---|
| 9,237,307 B1 | 1/2016 | Vendrow | |
| 9,451,178 B2* | 9/2016 | Kelder | H04N 5/2621 |
| 9,477,744 B2* | 10/2016 | Barthel | G06F 16/48 |

(Continued)

FOREIGN PATENT DOCUMENTS

JP    2006-148842 A    6/2006

Primary Examiner — Nigar Chowdhury
(74) Attorney, Agent, or Firm — Seed IP Law Group LLP

(57) ABSTRACT

Provided is a wearable camera including a capture that captures a subject; a recorder that records a video of the captured subject; a storage that stores a predetermined sound beforehand; a microphone that collects sounds; and a controller that starts record of the video of the subject captured by the capture in a case where the sounds collected by the microphone and the sound stored in the storage are collated with each other, and the collected sounds and the stored sound match with each other.

13 Claims, 11 Drawing Sheets

(56) References Cited

U.S. PATENT DOCUMENTS

| | | | |
|---|---|---|---|
| 9,819,896 B2 | 11/2017 | Waniguchi et al. | |
| 10,229,327 B2* | 3/2019 | Koyama | G06K 9/00771 |
| 10,702,243 B2* | 7/2020 | Yang | A61B 8/14 |
| 2003/0160862 A1* | 8/2003 | Charlier | H04N 5/23238 |
| | | | 348/14.08 |
| 2004/0120417 A1* | 6/2004 | Lynch | H04H 20/31 |
| | | | 375/272 |
| 2005/0100329 A1* | 5/2005 | Lao | G08B 13/19669 |
| | | | 386/216 |
| 2006/0004582 A1* | 1/2006 | Claudatos | G08B 13/1672 |
| | | | 704/275 |
| 2006/0095199 A1* | 5/2006 | Lagassey | B62D 41/00 |
| | | | 701/117 |
| 2007/0050190 A1* | 3/2007 | Washio | G10L 15/22 |
| | | | 704/249 |
| 2008/0037534 A1* | 2/2008 | Shina | H04M 3/4938 |
| | | | 370/389 |
| 2008/0162133 A1* | 7/2008 | Couper | G08B 13/1672 |
| | | | 704/239 |
| 2011/0069172 A1* | 3/2011 | Hazzani | G08B 13/19658 |
| | | | 348/159 |
| 2012/0093477 A1* | 4/2012 | M | G08B 13/19697 |
| | | | 386/230 |
| 2012/0220276 A1* | 8/2012 | Kobylarz | H04W 4/00 |
| | | | 455/414.1 |
| 2013/0235245 A1* | 9/2013 | Eaton | H04N 5/23219 |
| | | | 348/333.01 |
| 2013/0279757 A1* | 10/2013 | Kephart | G06Q 50/265 |
| | | | 382/105 |
| 2014/0072154 A1* | 3/2014 | Tachibana | H04R 5/033 |
| | | | 381/309 |
| 2014/0169534 A1* | 6/2014 | Bentley | G10L 25/48 |
| | | | 379/45 |
| 2014/0253326 A1* | 9/2014 | Cho | G08B 7/066 |
| | | | 340/539.13 |
| 2014/0269199 A1* | 9/2014 | Weldon | G01S 5/18 |
| | | | 367/124 |
| 2014/0270383 A1* | 9/2014 | Pederson | G08G 1/04 |
| | | | 382/104 |
| 2014/0320291 A1 | 10/2014 | De Luca et al. | |
| 2014/0368601 A1* | 12/2014 | deCharms | H04W 4/021 |
| | | | 348/14.02 |
| 2015/0120336 A1 | 4/2015 | Grokop et al. | |
| 2015/0124985 A1 | 5/2015 | Kim | |
| 2015/0138362 A1* | 5/2015 | Stefik | G07F 17/246 |
| | | | 348/148 |
| 2015/0156552 A1 | 6/2015 | Wayans et al. | |
| 2015/0312649 A1* | 10/2015 | Gopalan | H04N 21/458 |
| | | | 725/32 |
| 2015/0341591 A1* | 11/2015 | Kelder | H04N 9/806 |
| | | | 386/285 |
| 2015/0347079 A1* | 12/2015 | Price | G08B 25/016 |
| | | | 700/94 |
| 2016/0011847 A1 | 1/2016 | Choe et al. | |
| 2016/0042767 A1 | 2/2016 | Araya et al. | |
| 2016/0086462 A1* | 3/2016 | Meganathan | G11B 27/34 |
| | | | 348/155 |
| 2016/0180658 A1* | 6/2016 | Degrassi | G07G 1/00 |
| | | | 340/384.7 |
| 2017/0006453 A1 | 1/2017 | Liu et al. | |
| 2017/0039831 A1* | 2/2017 | Weng | G08B 15/02 |
| 2018/0048851 A1 | 2/2018 | Waniguchi et al. | |

\* cited by examiner

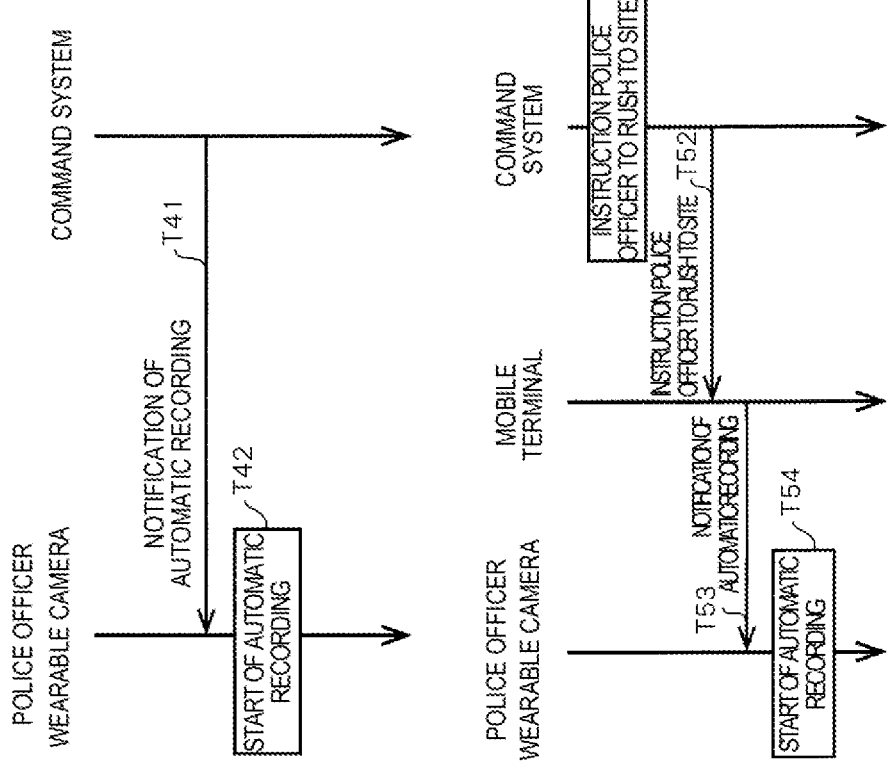

WEARABLE CAMERA SYSTEM AND RECORDING CONTROL METHOD

BACKGROUND

1. Technical Field

The present disclosure relates to a wearable camera system which controls recording of a video captured by a wearable camera and a recording control method.

2. Description of the Related Art

Recently, in order to efficiently assist police officers with their services, a system in which police officers have a wearable camera mounted on a uniform or carry a wearable camera at the time of patrolling, for example has been examined.

As a related art using a wearable camera, a wearable monitoring camera system disclosed in Japanese Patent Unexamined Publication No. 2006-148842 is exemplified. The wearable monitoring camera system disclosed in Japanese Patent Unexamined Publication No. 2006-148842 has a configuration in which an image (video) signal and a sound signal from a CCD camera and a microphone which are wearable, and a date and time information signal from a built-in clock are encoded by an encoding server which can be accommodated in a wearable pouch, and then the date and time information which is converted into text information is superimposed on a captured image so as to record the aforementioned information.

Here, a case where the wearable camera disclosed in Japanese Patent Unexamined Publication No. 2006-148842 is used by being mounted on a uniform of a police officer is assumed. It is assumed that in the case where the police officer has the aforementioned wearable camera disclosed in Japanese Patent Unexamined Publication No. 2006-148842 mounted on his or her uniform, upon finding a monitoring subject such as a suspicious person or a stolen car, the police officer pushes a recording switch so as to start recording image data (an image signal).

However, in the configuration disclosed in Japanese Patent Unexamined Publication No. 2006-148842, in a case where an incident suddenly happens, a police officer is required to promptly take various actions with respect to the incident in consideration that an initial operation or an initial investigation is important, and if the police officer cannot afford to press a recording switch of the wearable camera in a site of an incident and thus forgets to record a video, there may be missing of the recording as a result. That is, there is a problem in that it is not possible to remain recording of an evidence video for a site or a suspect involved in an incident in the wearable camera, and thus the video of the incident site cannot be obtained, a district police office cannot take quick and appropriate actions with respect to the occurrence of the incident, and thereby early resolution of the incident may become difficult. In addition, if the recording of the evidence video cannot be performed, it is not possible to present sufficient evidence in court afterward, and as a result, there is a possibility of causing a great deal of trouble.

SUMMARY

The present disclosure is made in consideration of the above described circumstances, and an object thereof is to provide a wearable camera system which efficiently assists police officers with their services by starting recording of a video captured by a wearable camera so as to prevent the recording from missing even if a police officer does not perform a recording operation in person when an incident happens, and a method of controlling recording.

According to an aspect of the present disclosure, there is provided a wearable camera including a capture that captures a subject; a recorder that records a video of the captured subject; a storage that stores a predetermined sound beforehand; a microphone that collects sounds; and a controller that starts record of the video of the subject captured by the capture in a case where the sounds collected by the microphone and the sound stored in the storage are collated with each other, and the collected sounds and the stored sound match with each other.

According to the present disclosure, the wearable camera system is capable of efficiently assisting police officers with their services by starting recording of a video captured by a wearable camera so as to prevent the recording from missing even if a police officer does not perform a recording operation in person when an incident happens.

BRIEF DESCRIPTION OF THE DRAWINGS

FIG. 11A is a diagram illustrating automatic recording in Modification example 1; and FIG. 11B is a diagram illustrating automatic recording in Modification example 2.

DETAILED DESCRIPTION

Figure 1:
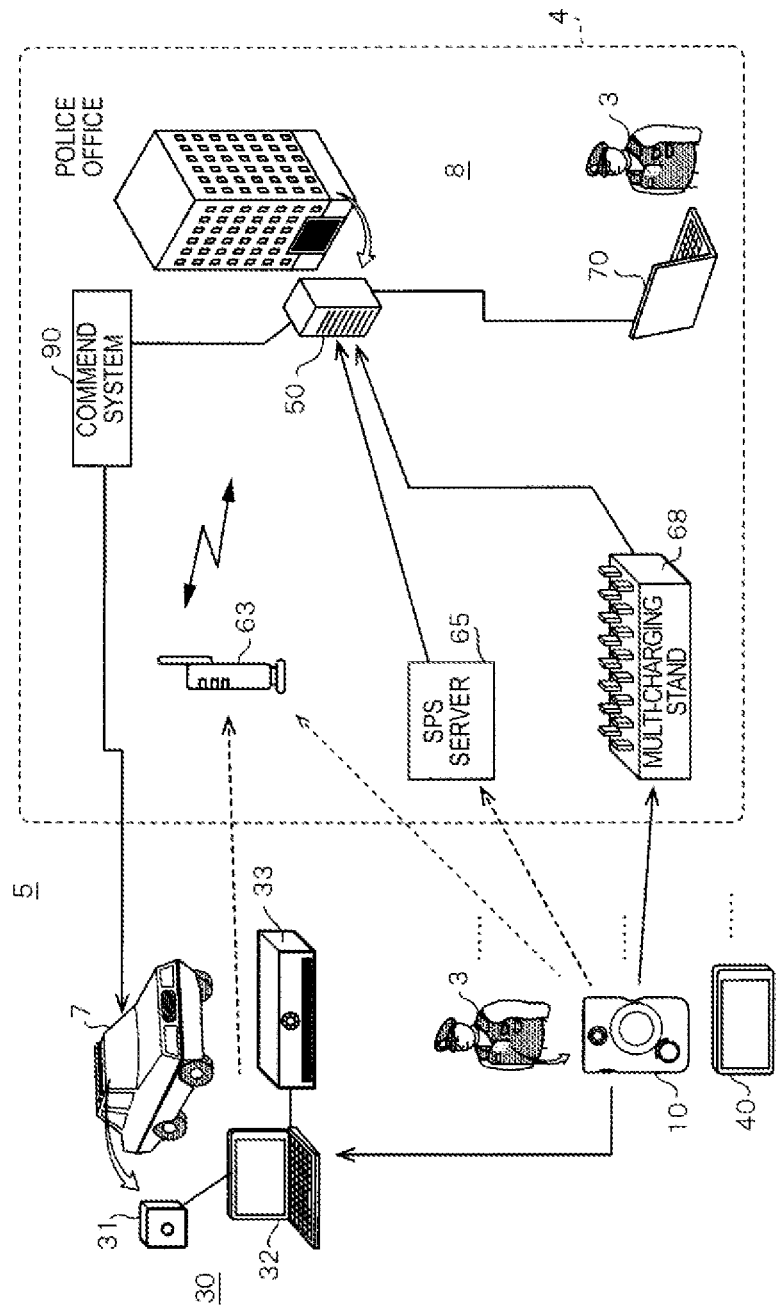
FIG. 1 is an explanatory diagram illustrating an example of an outline of a wearable camera system of the exemplary embodiment.

Hereinafter, embodiments which specifically disclose a wearable camera system and a recording control method will be described in detail by properly referring to the drawings. Note that, detailed description more than necessary may be omitted. For example, there may be omitted a detailed description of the already well-known matters and a duplicate description of substantially the same structure. This is to avoid that the following description is unnecessarily redundant, and to facilitate the understanding of those skilled in the art. It should be noted that the inventors of the present disclosure provide the accompanying drawings and the description below so that those skilled in the art fully understand the present disclosure, and do not intend to limit the subject matter described in the claims by these.

First Embodiment

FIG. 1 is an explanatory diagram illustrating an example of an outline of wearable camera system 5 of the exemplary embodiments. Wearable camera system 5 is configured to include on-vehicle camera system (in car video system (ICV)) 30 which is mounted on patrol car 7, wearable camera 10 which is mounted on a uniform of police officer 3, and in-office system 8 installed in the inside of police office 4.

On-vehicle camera system 30 includes one or more of on-vehicle cameras 31, on-vehicle personal computer (PC) 32, and on-vehicle recorder 33, and captures a video based on captured images of an incident happened when police officers patrol by driving patrol car 7 so as to record the incident. One or more of on-vehicle cameras 31 include one or more cameras among a camera which is installed so as to capture the front of a patrol car 7, and cameras which are respectively installed so as to capture the left, the right, and the rear of the patrol car. On-vehicle PC 32 controls operations of on-vehicle camera 31 and on-vehicle recorder 33 in accordance with an instruction operated by police officer 3. On-vehicle recorder 33 records video data captured by each on-vehicle camera 31 in the time series.

On-vehicle camera system 30 is wirelessly connected to back end server (BES) 50 in in-office system 8, selects specific video data from the items of video data recorded in on-vehicle recorder 33, and is capable of transmitting the selected specific video data to back end server 50. In addition, on-vehicle camera system 30 is communicably connected to wearable camera 10, and records the video data captured by wearable camera 10 and collected audio data in on-vehicle recorder 33. In the following description, it is assumed that the audio data includes sound of gunshot when a pistol which belongs to a suspect or a criminal of the incident is shot during the patrol or in the site of the incident, for example.

Wearable camera 10 which is mounted on the uniform of police officer 3 captures the front of the police officer as a subject, and transmits the captured video data and collected audio data to on-vehicle camera system 30. Hereinafter, a subject which is supposed to be a capturing target of wearable camera 10 and on-vehicle camera 31 includes not only a person, but also a scene of a site of an incident, crowds gathering near the site (so-called, onlookers), and atmosphere around a capturing position. In addition, police officer 3 carries smart phone 40 which is capable of communicating with wearable camera 10. Smart phone 40 has a telephone function and a wireless communication function, and is one example of a portable terminal which is generally used to contact with the police office in emergency situations. Wearable camera 10 is connected to back end server 50 via on-vehicle camera system 30, directly, or via smart phone 40 so as to transmit video data and the audio data to back end server 50. In addition, wearable camera 10 is manually attached to multi-charging stand 68 described below so as to transmit the video data and the audio data to back end server 50.

In-office system 8 which is installed in the inside of police office 4 includes back end server 50, streaming proxy server (SPS) 65, client PC 70, wireless LAN access point 63, multi-charging stand 68, and command system 90.

Back end server 50 manages an evidence video of the incident. Back end server 50 has a face recognition function of recognizing a face of a frame of an image constituting a video captured by wearable camera 10 or on-vehicle camera 31, and a sound recognition function of recognizing audio data included in cut-out data (refer to the following description) which is transmitted from wearable camera 10 or on-vehicle camera system 30. In addition, back end server 50 includes audio database 58z (refer to FIG. 6) as one example of the storage in which a predetermined audio data (that is, the audio data of the sound which is likely to be generated during the patrol or the site of the incident) during the patrol or relating to the incident is registered. The predetermined audio data during the patrol or relating to the incident includes, for example, the audio data such as a sound of gunshot when the suspect or the police officer shoots a gun, a sound made by the police officer who is trained in advance to emit when sensing danger during the patrol or when the incident happens, and a sound when the police officer is fell down on the ground or the like (for example, "with a dull thud"). Back end server 50 performs the sound recognition of the audio data included in cut-out data (refer to the following description) which is transmitted from wearable camera 10 or on-vehicle camera system 30, and then collates the sound obtained by the sound recognition with the sound registered in audio database 58z. Note that, storage 58 which stores audio database 58z may be installed in the inside or the outside of police office 4 as long as storage 58 is accessible to back end server 50.

Streaming proxy server 65 receives the video data which is streaming-distributed from wearable camera 10, and transfers video data to back end server 50. In addition, streaming proxy server 65 may receive the video data which is streaming-distributed from on-vehicle camera system 30 and transfer the video data to back end server 50.

Client PC 70 includes a browser which accesses suspicious person database (not shown) of back end server 50, and detects information on a criminal or the like of the incident so as to display the detected result on a display device (for example, liquid crystal display (LCD) which is previously provided in client PC 70). A person on the wanted list, an ex-convict, or the like is previously registered by corresponding to information for identifying incidents (for example, case number) in the suspicious person database. Client PC 70 is capable of accessing audio database 58z of back end server 50, and searching the information on the incident such as the criminal or the like. Note that, client PC 70 may be installed not only in the inside of police office 4 but also in the outside of the police office 4. Further, client PC 70 may be any one of a thin client PC and a rich client PC.

Wireless LAN access point 63 is wirelessly connected to on-vehicle camera system 30 and wearable camera 10, and transmits video data and the audio data recorded in on-vehicle camera system 30 and the video data and the audio data recorded in wearable camera 10 to back end server 50.

Multi-charging stand 68 on which wearable cameras 10 which are mounted on the uniforms of police officers 3 or belongs to police officers 3 can be mounted has functions of charging the mounted wearable cameras 10 and transmitting the video data and the audio data stored in wearable camera 10 to back end server 50 by performing wire communication with wearable camera 10. In addition, multi-charging stand 68 is wirely connected to back end server 50 via a universal serial bus (USB) cable.

Command system 90 is connected to back end server 50, and in a case where an incident happens, in accordance with an instruction from back end server 50, command system 90 transmits various dispatch commands to the patrol car in which the police officer who is supposed to dispatch to the site of the incident such that the police officer rushes to the site of the incident so as to secure the site and a suspect, and support the police officers having arrived at the site. In accordance with the instruction which is input-operated by the police officer, command system 90 may transfer the command to the police officer who is supposed to dispatch to the site of the incident. In addition, command system 90 may not be directly connected to back end server 50, and in a case where the incident happens command system 90 may wirelessly transmit various dispatch commands to the patrol car in which the police officer who is supposed to dispatch to the site of the incident without depending on back end server 50.

In wearable camera system 5, wearable camera 10 is connected to on-vehicle camera system 30 so as to transfer data via near field communication or by using a signal cable such as USB. The video data captured by wearable camera 10 and the collected audio data are transferred to on-vehicle camera system 30, and played or recorded by on-vehicle camera system 30, and then are transmitted to back end server 50.

On-vehicle camera system 30 records the video data captured by on-vehicle camera 31 and the video data and the audio data captured by wearable camera 10 in on-vehicle recorder 33, cut outs the section of sound collected by wearable camera 10, and transmits the cut-out data including the cut-out sound to back end server 50 via wireless local area network (LAN).

Similarly, wearable camera 10 can cut out the section of sound collected by wearable camera 10, and transmit the cut-out data including the cut-out sound to back end server 50 via wireless LAN. In a case where a sound having an unexpected large sound volume appears, the cutting out of the sound section is performed so as to include the sound. Note that, the cutting out of the sound section may be performed so as to sample a certain section at a certain cycle. In this case, in the section where there the sound having an unexpected large sound volume does not appear, only a sound having a small volume of the surrounding is cut out.

Further, police officer 3 who returns to police office 4 mounts wearable camera 10 on multi-charging stand 68, and multi-charging stand 68 charges wearable camera 10, and can transmit the cut-out data recorded in wearable camera 10 to back end server 50 via a USB cable.

When receiving the cut-out data from the on-vehicle camera system 30 and wearable camera 10, back end server 50 recognizes the sound included in the cut-out data, collates the recognized sound with the sound registered in audio database 58z in which the predetermined audio data during the patrol or relating to the incident is registered in advance, and then notifies on-vehicle camera system 30 and wearable camera 10 of the result of the collation.

In addition, when police officer 3 requires back end server 50 to perform process of searching the sound involved in the incident by operating client PC 70, and back end server 50 searches the sound registered in suspicious audio database 58z in accordance with the request of client PC 70.

Figure 2:
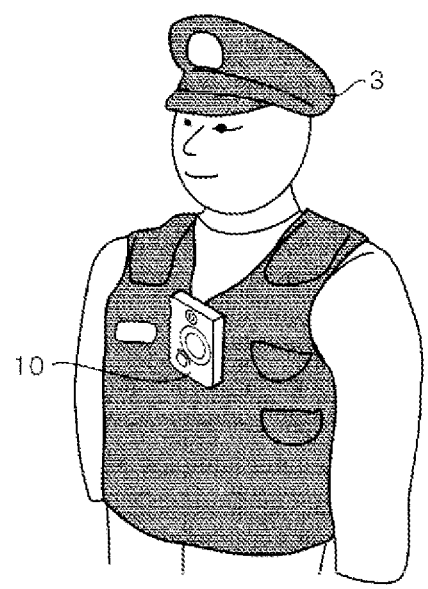
FIG. 2 is a diagram illustrating an example of an upper body of a police officer wearing a uniform with a wearable camera of the exemplary embodiment.

FIG. 2 is a diagram illustrating an example of an upper body of police officer 3 wearing a uniform with wearable camera 10 of the exemplary embodiments. Wearable camera 10 is placed on a front portion of the uniform of police officer 3 so as to capture the front of police officer 3. For example, wearable camera 10 may be fixed on the front portion in a state of hanging on a string from the neck, or may be fixed on the front portion of the uniform by causing a mounting tool (for example, a mounting clip) attached to the rear surface of housing 10z (refer to FIG. 3) of wearable camera 10 to engage with a mounted tool which is attached on the front portion of the uniform.

Figure 3:
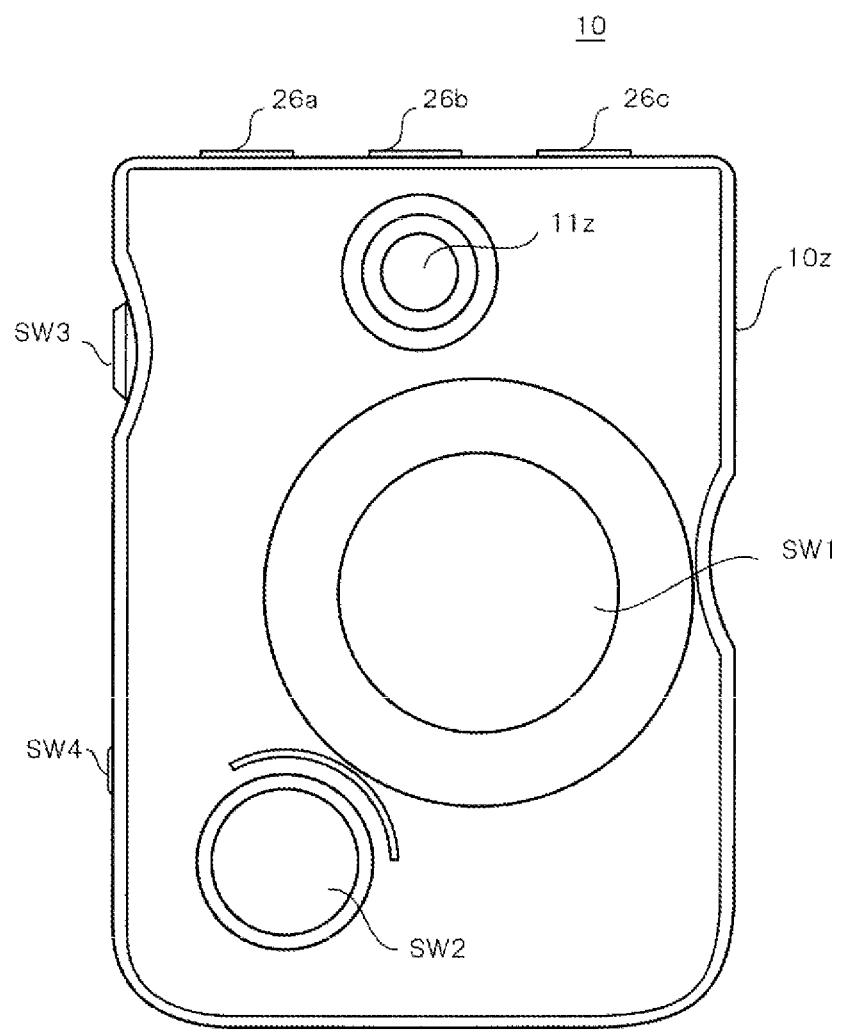
FIG. 3 is a front view illustrating an example of a front-side surface of a housing of the wearable camera of the exemplary embodiment.

FIG. 3 is a front view illustrating an example of a front-side surface of housing 10z of wearable camera 10 of the exemplary embodiment. Recording switch SW1, snapshot switch SW2, and imaging lens 11z are disposed on the surface of the front side of housing 10z. A short press of recording switch SW1 instructs that the recording is started, and a long press (for example, an operation in which pressing state is continued for three seconds) of recording switch SW1 instructs that the recording is stopped. Snapshot switch SW2 instructs that a still image captured by capture 11 is recorded whenever being pressed. Imaging lens 11z forms an optical image of a subject to be captured by wearable camera 10 on an imaging area of capture 11 (refer to FIG. 4).

Communication mode switch SW3 and attribute information imparting switch SW4 are disposed on the side surface of housing 10z. Three LEDs 26a, 26b, and 26c are disposed on the upper surface of housing 10z. LED 26a displays a state of turning on or off of power of wearable camera 10 and a state of battery 25 (refer to FIG. 4). LED 26b displays a state of an imaging operation of wearable camera 10. LED 26c displays a state of a communication mode of wearable camera 10.

Figure 4:
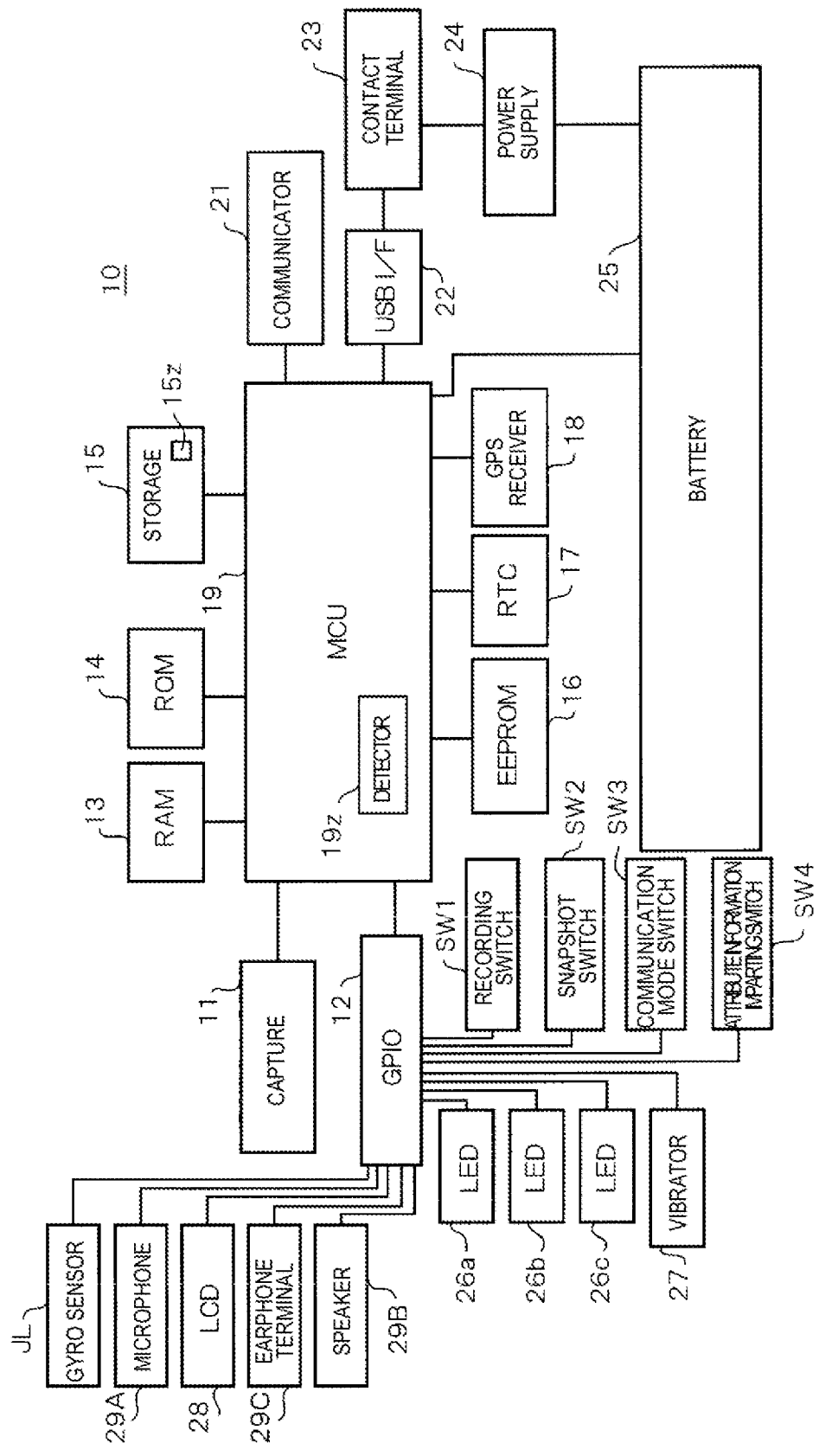
FIG. 4 is a block diagram illustrating an example of an internal configuration of the wearable camera of a first exemplary embodiment.

FIG. 4 is a block diagram illustrating an example of an internal configuration of wearable camera 10 of a first exemplary embodiment. Wearable camera 10 is provided with capture 11, general purpose input/output 12 (GPIO), random access memory (RAM) 13, read only memory (ROM) 14, and storage 15. Wearable camera 10 is provided with electrically erasable programmable rom (EEPROM) 16, real time clock (RTC) 17, and global positioning system (GPS) receiver 18. Wearable camera 10 is provided with micro controller (MCU) 19, communicator 21, universal serial bus (USB) interface (I/F) 22, Contact terminal 23, power supply 24, and battery 25. Wearable camera 10 is provided with recording switch SW1, snapshot switch SW2, communication mode switch SW3, and attribute information imparting switch SW4.

Wearable camera 10 is provided with three light emitting diodes (LED) 26a, 26b, and 26c, and vibrator 27.

Capture 11 includes imaging lens 11z (refer to FIG. 3), and a solid-state image sensing element formed of a charge coupled device (CCD) type image sensor or a complementary metal oxide semiconductor (CMOS) type image sensor. Capture 11 outputs the captured video data of the subject to MCU 19.

GPIO 12 is a parallel interface. Recording switch SW1, snapshot switch SW2, communication mode switch SW3, attribute information imparting switch SW4, LEDs 26a to 26c, vibrator 27, LCD 28, earphone terminal 29C as an example of a sound output terminal, speaker 29B, microphone 29A as one example of a sound collector, and gyro sensor JL are connected to GPIO 12. GPIO 12 inputs and outputs signals between the aforementioned various electronic components and MCU 19. For example, microphone 29A collects ambient sounds of wearable camera 10, and outputs the collected audio data to MCU 19 via GPIO 12. Microphone 29A may be a built-in microphone which is accommodated in housing 10z of wearable camera 10, or may be a wireless microphone which is wirelessly connected to wearable camera 10. In a case of the wireless microphone, the police officers can attach the wireless microphone to any position of their body, and thus it is possible to enhance the sound collection.

RAM 13 is a work memory which is used to operate, for example, MCU 19. ROM 14 stores program and data in advance so as to control, for example, MCU 19.

Storage 15 as one example of a recorder is formed of a storing medium such as a memory card, and starts recording the video data captured by capture 11 based on the instruction to automatically start the recording (that is, instruction of recording start). Further, storage 15 includes setting data file 15z in which information for resolution enhancement is set. For example, in the case where storage 15 is formed of the memory card, storage 15 is removably inserted into the housing 10z of wearable camera 10.

EEPROM 16 stores, for example, identification information (for example, a serial number as a camera ID) for identifying wearable camera 10, and various types of setting information. RTC 17 counts and outputs information on the current time to MCU 19.

GPS receiver 18 receives position information and time information of current wearable camera 10 (master device) from a GPS transmitter (not shown), and outputs to MCU 19. The time information is also used to correct a system time of wearable camera 10. The system time is used to record a capturing time of the captured image (including a still image and a video).

MCU 19 serves as a controller of wearable camera 10, for example, and performs a control process of controlling the entire operations of the respective portions of wearable camera 10, a data input and output process between the respective portions of wearable camera 10, a data computing (calculating) process, and a data storing process. MCU 19 is operated in accordance with the program and data stored in ROM 14. MCU 19 acquires the information on the current time from RTC 17 by using RAM 13 during the operation, and acquires information on the current position from GPS receiver 18.

MCU 19 includes detector 19z which can be realized by execution of an application program, and generates audio data which is obtained by cutting out the section of sound among items of audio data collected by microphone 29A by using detector 19z.

Communicator 21 as one example of a transmitter and a receiver is used to transmit the audio data generated in detector 19z to back end server 50, and regulates the connection between communicator 21 and MCU 19 in a physical layer which is a first layer of an open systems interconnection (OSI) reference model. Communicator 21 performs wireless communication (for example, Wi-Fi (trade mark)) by wireless LAN (W-LAN) in accordance with the aforementioned regulation. Note that, communicator 21 may perform wireless communication near field communication (NFC) or Bluetooth (trade mark).

USB interface 22 is a serial bus, and enables the connection between on-vehicle camera system 30 and client PC 70 and the like in the police office.

Contact terminal 23 which is a terminal for electrically connecting to a cradle (not shown) or an external adapter (not shown) is connected to MCU 19 via USB interface 22, and is connected to power supply 24. Battery 25 is charged via contact terminal 23, and contact terminal 23 enables the communication of the image data or the like.

Contact terminal 23 is provided with "charging terminal V+", "CON.DET terminal", "data terminals D− and D+" and "ground terminal" (which are not shown). The CON.DET terminal is a terminal for detecting voltage and change of the voltage. Data terminals D− and D+ are terminals for transferring the images captured by wearable camera 10 to an external PC or the like via a USB connector terminal, for example.

When contact terminal 23 is connected to a connector such as the cradle (not shown) or the external adapter (not shown), the date communication can be performed between wearable camera 10 and external device.

For example, power supply 24 supplies electric power supply supplied from the cradle or the external adapter to battery 25 via contact terminal 23 so as to charge battery 25. Battery 25 is formed of, for example, a chargeable secondary battery, and supplies electric power supply to the respective portions of the wearable camera 10.

Recording switch SW1 is a pressing button switch for inputting an operation instruction to start or stop the recording (capturing video) through a pressing operation performed by police officer 3. When recording switch SW1 is pressed odd number of times, the recording (capturing video) is started, and when being pressed even number of times, the recording is finished. Further, when recording switch SW1 is pressed twice in succession, as described below, it serves as an emergency button.

Snapshot switch SW2 is a pressing button switch for inputting an operation instruction to capture a still image through a pressing operation performed by police officer 3. Whenever snapshot switch SW2 is pressed, the still image is captured at the time of being pressed.

Communication mode switch SW3 is a slide switch for inputting an operation instruction to set a communication mode between wearable camera 10 and the external device. The communication mode includes, for example, an access-point mode, a station mode, and an OFF mode.

The access-point mode is a mode in which wearable camera 10 is operated as an access point of the wireless LAN, and is wirelessly connected to smart phone 40 which is belongs to police officer 3 such that the communication is performed between wearable camera 10 and smart phone 40. In the access-point mode, smart phone 40 is connected to wearable camera 10, and thus can perform display of the current live image, playback of the recorded image, and display of the captured still image through wearable camera 10.

The station mode is a mode in which the communication is performed with an external device as an access point in a case of connecting to the external device by using the wireless LAN. For example, smart phone 40 is set as an external device by using a tethering function of smart phone 40. In the station mode, wearable camera 10 can perform, for example, various settings and transferring (uploading) of the recorded images kept by wearable camera 10 with respect to on-vehicle camera system 30 or client PC 70 or back end server 50 in police office 4.

The OFF mode is a mode in which a communicating operation of the wireless LAN is off, and the wireless LAN is set to be in an unused state.

Attribute information imparting switch SW4 is a pressing button switch for imparting attribute information to the video data.

LED 26a is a display which displays a power-on state of wearable camera 10 (a state of being turned on and off) and a state of battery 25. LED 26b is a display which displays a state of a capturing operation of wearable camera 10 (a recording state). LED 26c is a display which displays a state of a communication mode of wearable camera 10. In addition, when wearable camera 10 receives notification data from back end server 50, three LEDs 26a to 26c perform a flashing operation in accordance with the instruction from MCU 19. At this time, MCU 19 changes flashing patterns of LEDs 26a to 26c in accordance with the levels of importance of the information on the person included in the notification data.

Gyro sensor JL detects an angular velocity (that is, rotation angle per unit time) of wearable camera 10 and detects that police officer 3 who has wearable camera 10 mounted on the uniform or carries wearable camera 10 is fell down (Man Down), for example. The detection result of Gyro sensor IL is input to MCU 19 via GPIO 12. Wearable camera 10 can accurately detect behavior of police officer 3 who has wearable camera 10 mounted on the uniform or carries wearable camera 10, such as rotations (for example, fell down on the ground, fell down on the ground by being shot by the pistol, and fell down on the ground by being attacked by a deadly weapon) by using gyro sensor JL.

MCU 19 performs the input and detection of each of recording switch SW1, snapshot switch SW2, communication mode switch SW3, and attribute information imparting switch SW4, and performs processing with respect to the operated switch input.

In a case where the operated input of recording switch SW1 is detected, MCU 19 controls the start or the stop of the imaging operation in capture 11, and stores the image obtained from capture 11 as a video in storage 15.

In a case where the operated input of snapshot switch SW2 is detected, MCU 19 stores the image captured by capture 11 when snapshot switch SW2 is operated as a still image in storage 15.

MCU 19 detects the state of communication mode switch SW3, and operates communicator 21 by the communication mode in accordance with the setting of communication mode switch SW3.

In a case where attribute information imparting switch SW4 is pressed, MCU 19 imparts the attribute information to the cut-out data including the face image which is cut out from the image captured by capture 11.

Figure 5:
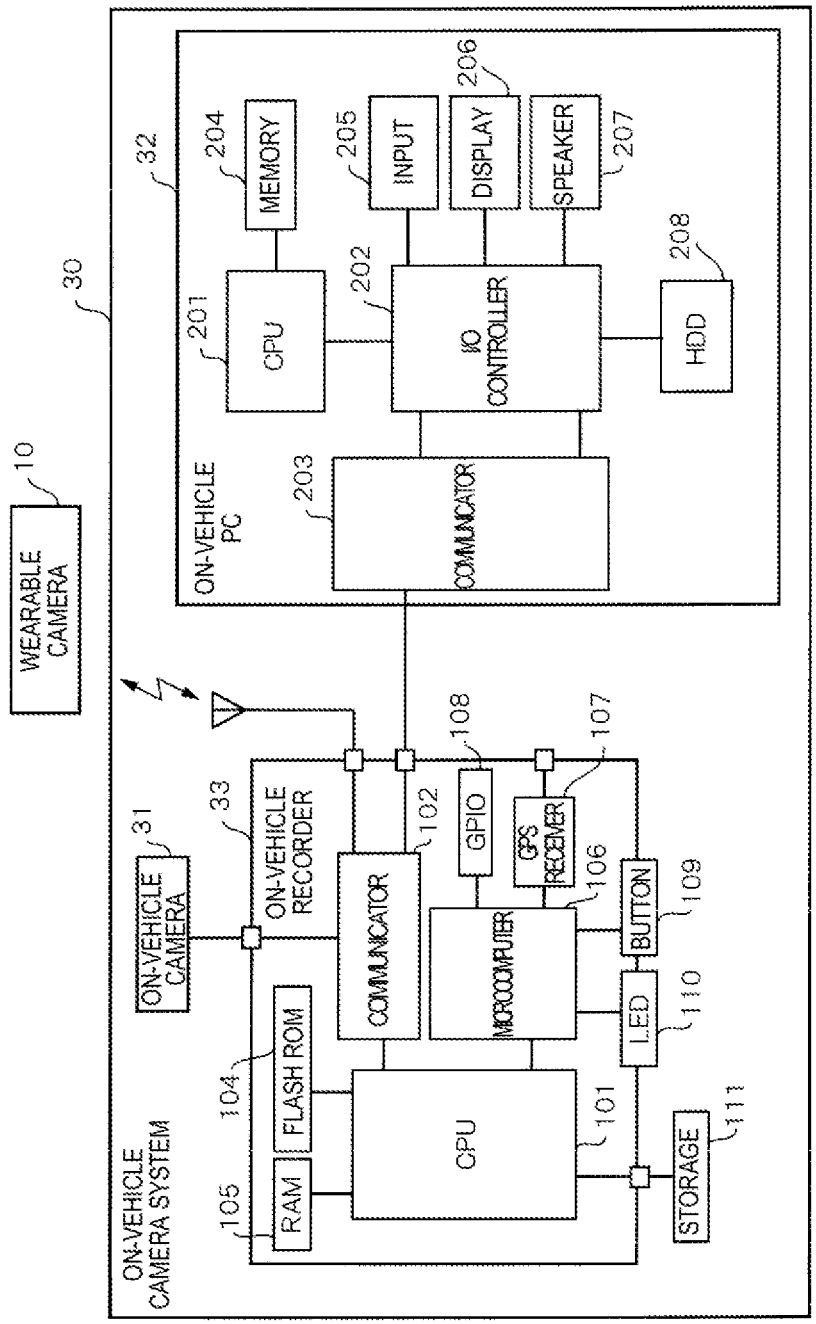
FIG. 5 is a block diagram illustrating an example of an internal configuration of an on-vehicle camera system of the exemplary embodiment.

FIG. 5 is a block diagram illustrating an example of an internal configuration of on-vehicle camera system 30 of the exemplary embodiments. On-vehicle camera system 30 is configured to include on-vehicle camera 31, on-vehicle recorder 33, and on-vehicle PC 32.

On-vehicle recorder 33 is configured to include CPU 101, communicator 102, flash ROM 104, RAM 105, microcomputer 106, GPS receiver 107, GPIO 108, button 109, LED 110, and storage 111.

CPU 101 performs a control process of controlling the entire operations of the respective portions of on-vehicle recorder 33, a data input and output process between the respective portions, a data computing (calculating) process, and a data storing process. CPU 101 is operated in accordance with the program and data stored in flash ROM 104.

Communicator 102 wirelessly communicates with an external device via a wireless line or a wired line. Examples of the wireless communication include wireless local area network (LAN) communication, near field communication (NFC), and Bluetooth (trade mark). The wireless LAN communication is performed in accordance with IEEE802.11n regulation of Wi-Fi (trade mark). CPU 101 and communicator 102 are connected to each other via a peripheral component interconnect (PCI) or a USB interface. Wire communication includes wire LAN communication.

Communicator 102 performs the wire communication between on-vehicle camera 31 and on-vehicle PC 32, for example. Communicator 102 performs the wireless communication between wearable camera 10 and client PC 70 and back end server 50 of police office 4. FIG. 5 illustrates an example in which on-vehicle recorder 33 is wirely connected to on-vehicle camera 31 and on-vehicle PC 32 via communicator 102, and is wirelessly connected to wearable camera 10.

Flash ROM 104 is a memory which stores program and data for controlling, for example, CPU 101. In addition, various types of setting information are stored in flash ROM 104.

RAM 105 is a work memory which is used in the operation of CPU 101. A plurality of RAMs 105 are provided.

Microcomputer 106 which is one type of a microcomputer is connected to the respective portions (for example, GPS receiver 107, GPIO 108, button 109, and LED 110) relating to the external interface, and performs the control relating to the external interface. Microcomputer 106 is connected to CPU 101 via a universal asynchronous receiver transmitter (UART), for example.

GPS receiver 107 receives the information of the current position of on-vehicle recorder 33 and time information from the GPS transmitter (not shown) and outputs to CPU 101. The time information is used to correct the system time of on-vehicle recorder 33.

GPIO 108 is, for example, a parallel interface, and inputs and outputs signals between the connected external device (not shown) and MCU 19 via GPIO 108. Various sensors (for example, a speed sensor, an acceleration sensor, and a door opening and closing sensor) are connected to GPIO 108.

Button 109 includes a recording button for starting or stopping the recording of the image captured by on-vehicle camera 31. Button 109 is not limited to a button type but may be a switch type as long as it is possible to switch states in various ways.

LED 110 displays a power-on state of on-vehicle recorder 33 (a state of being turned on and off), a recording state, a connection state of on-vehicle recorder 33 to LAN, and a usage state of LAN connected to on-vehicle recorder 33, by turning the light on or off, and flashing the light.

Storage 111 is a storage device such as SSD and HDD, and stores the image (video) data recorded and captured by on-vehicle camera 31. Storage 111 may store the video which is recorded and captured, and the audio data which is collected and recorded by wearable camera 10. Further, storage 111 may store data audio data of the sounds collected by on-vehicle camera 31 in a case where on-vehicle camera 31 collects the sounds. Storage 111 is connected to CPU 101 via serial ATA (SATA). A plurality of storages 111 may be provided.

On-vehicle PC 32 is configured to include CPU 201, input/output (I/O) controller 202, communicator 203, memory 204, input 205, display 206, speaker 207, and HDD 208.

On-vehicle PC 32 can communicate with each of wearable camera 10 and on-vehicle recorder 33, and also communicate with each of back end server 50 and client PC 70 of in-office system 8.

CPU 201 performs a control process of controlling the entire operations of the respective portions of on-vehicle PC 32, a data input and output process between the respective portions via I/O controller 202, a data computing (calculating) process, and a data storing process. CPU 201 is operated in accordance with the program and data stored in memory 204.

I/O controller 202 performs control relating to the input and output of data between CPU 201 and the respective portions (for example, communicator 203, input 205, display 206, speaker 207, and HDD 208) of on-vehicle PC 32, and performs relay of the data from CPU 201 and data to CPU 201. Note that, I/O controller 202 may be integrally formed with CPU 201.

Communicator 203 wirely or wirelessly communicates with on-vehicle recorder 33, wearable camera 10 which is mountable on the uniform of police officer 3, or in-office system 8 side.

Memory 204 which is formed of, for example, RAM, ROM, and nonvolatile or volatile semiconductor memory serves as a work memory during the operation of CPU 201, and stores a predetermined program and data so as to operate CPU 201.

Input 205 is UI which receives and notifies an input operation of police officer 3 to CPU 201 via I/O controller 202, and is a pointing device such as a mouse and keyboard. Input 205 which is correspondingly disposed on the screen of display 206 may be formed of a touch panel or a touch pad which can be operated by a finger of police officer 3 or a stylus pen.

Display 206 is formed by using, for example, liquid crystal display (LCD) and organic electroluminescence (EL), and displays various types of information. In addition, display 206 displays an image on the screen under the instruction of CPU 201 in a case where the image which is captured (recorded) by wearable camera 10 is input in accordance with the input operation by police officer 3, for example.

Speaker 207 outputs the sound included in data under the instruction of CPU 201 in a case where the data including the video which is captured (recorded), and the sound which is collected by wearable camera 10 is input in accordance with the input operation by police officer 3, for example. Display 206 and speaker 207 may be separately formed from on-vehicle PC 32.

HDD 208 stores, for example, various types of data, and software (a software program). Specifically, HDD 208 stores, for example, software for performing control or setting of on-vehicle recorder 33, and software for performing control or setting of wearable camera 10. In addition, HDD 208 stores, for example, the image which is transferred from wearable camera 10, and captured by wearable camera 10.

Figure 6:
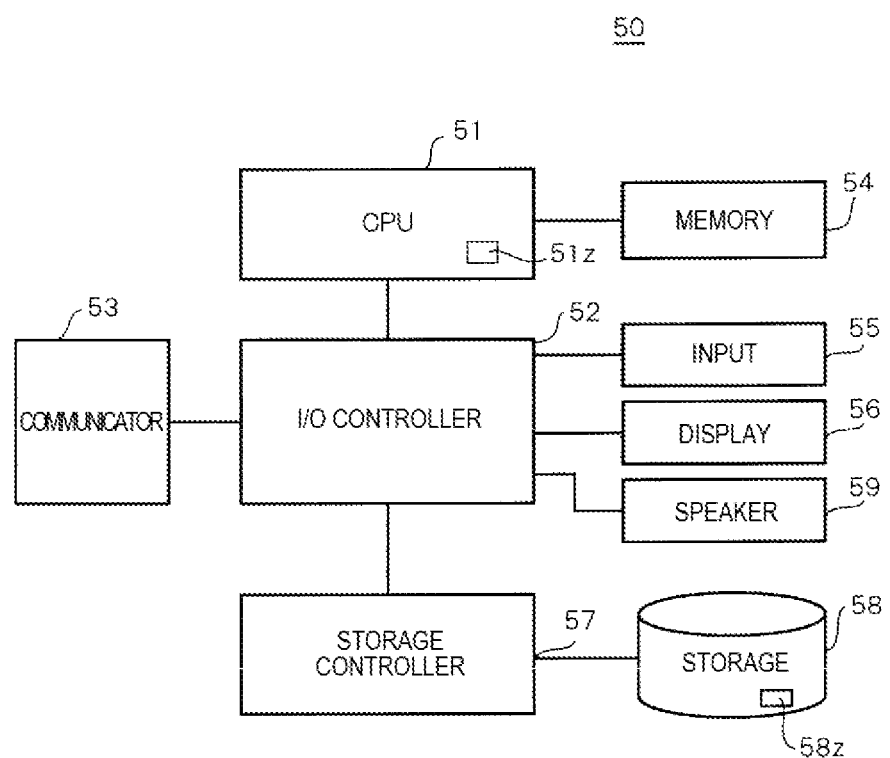
FIG. 6 is a block diagram illustrating an example of an internal configuration of a back end server of the exemplary embodiment.

FIG. 6 is a block diagram illustrating an example of an internal configuration of back end server 50 of the exemplary embodiments. Back end server 50 is provided with CPU 51, I/O controller 52, communicator 53, memory 54, input 55, display 56, speaker 59, storage controller 57, and storage 58.

CPU 51 performs a control process of controlling the entire operations of the respective portions of back end server 50, a data input and output process between the respective portions, a data computing (calculating) process, and a data storing process. CPU 51 is operated in accordance with the program and data stored in memory 54.

CPU 51 includes recognizer 51z as one example of a collator which can be realized by execution of an application program, and performs collation of sounds. Recognizer 51z analyzes the input audio data, extracts the features, and collates the extracted features with the features of the audio data registered in audio database 58z so as to determine whether or not the items of audio data are matched with each other. Note that, the sound recognition process is a well-known technique, and thus the details of the process of recognizer 51z will not be described.

I/O controller 52 performs control relating to the input and output of data between CPU 51 and the respective portions (for example, communicator 53, input 55, display 56, and storage controller 57) of back end server 50, and performs relay of the data from CPU 51 and data to CPU 51. Note that, I/O controller 52 may be integrally formed with CPU 51.

Communicator 53 wirely or wirelessly communicates with on-vehicle recorder 33, on-vehicle PC 32, smart phone 40, wearable camera 10 which is mountable on the uniform of police officer 3, or client PC 70.

Memory 54 which is formed of, for example, RAM, ROM, and nonvolatile or volatile semiconductor memory serves as a work memory during the operation of CPU 51, and stores a predetermined program and data so as to operate CPU 51.

Input 55 is UI which receives an input operation of police officer 3 or a person in charge in police office 4, and notifies CPU 51 of the input operation via I/O controller 52, and is a pointing device such as a mouse and keyboard. Input 55 which is correspondingly disposed on the screen of display 56 may be formed of a touch panel or a touch pad which can be operated by a finger of police officer 3 or the person in charge or a stylus pen.

Display 56 is formed by using, for example, LCD and organic EL, and displays various types of information. Display 56 displays a video on the screen under the instruction of CPU 51 in a case where the video which is captured or recorded by wearable camera 10 is input in accordance with the input operation by police officer 3 or the person in charge, for example. Display 56 displays a video on the screen under the instruction of CPU 51 in a case where the video which is captured or recorded by on-vehicle camera 31 is input in accordance with the input operation by police officer 3 or the person in charge, for example.

Speaker 59 outputs the sound under the instruction of CPU 51 in a case where the sound collected by wearable camera 10 is input in accordance with the input by police officer 3 or the person in charge, for example.

Storage controller 57 performs the control relating to storage 58.

Storage 58 is a storage device such as SSD and HDD, and stores the images recorded and captured by wearable camera 10 and on-vehicle camera 31. In addition, storage 58 may store data other than image (for example, audio data collected by wearable camera 10 and on-vehicle camera 31). Storage 58 is connected to CPU 51 via serial ATA (SATA).

Storage 58 stores audio database 58z. The predetermined audio data which is assumed to be emitted during the patrol or when the incident happens and notification information (for example, information on a sound source) corresponding to the audio data are registered in audio database 58z as one example of the storage. As the audio data, a sound of gunshot when the suspect or the police officer shoots a gun, a sound made by the police officer who is trained in advance to emit when sensing danger during the patrol or when the incident happens, and a sound when the police officer is fell down on the ground or the like are registered. Further, the input sound may include, for example, the voice of the criminal such as "put your hands up". The information on the sound source includes, for example, the name and performance of the pistol in a case of the sound of the gunshot.

An operation of wearable camera system 5 having the above-described configuration will be described. Here, an operation of automatically starting recording will be described by assuming a case where police officer 3 is in a hurry or has his or her hands full, and thus cannot press recording switch SW1 of wearable camera 10 when the incident happens.

Figure 7:
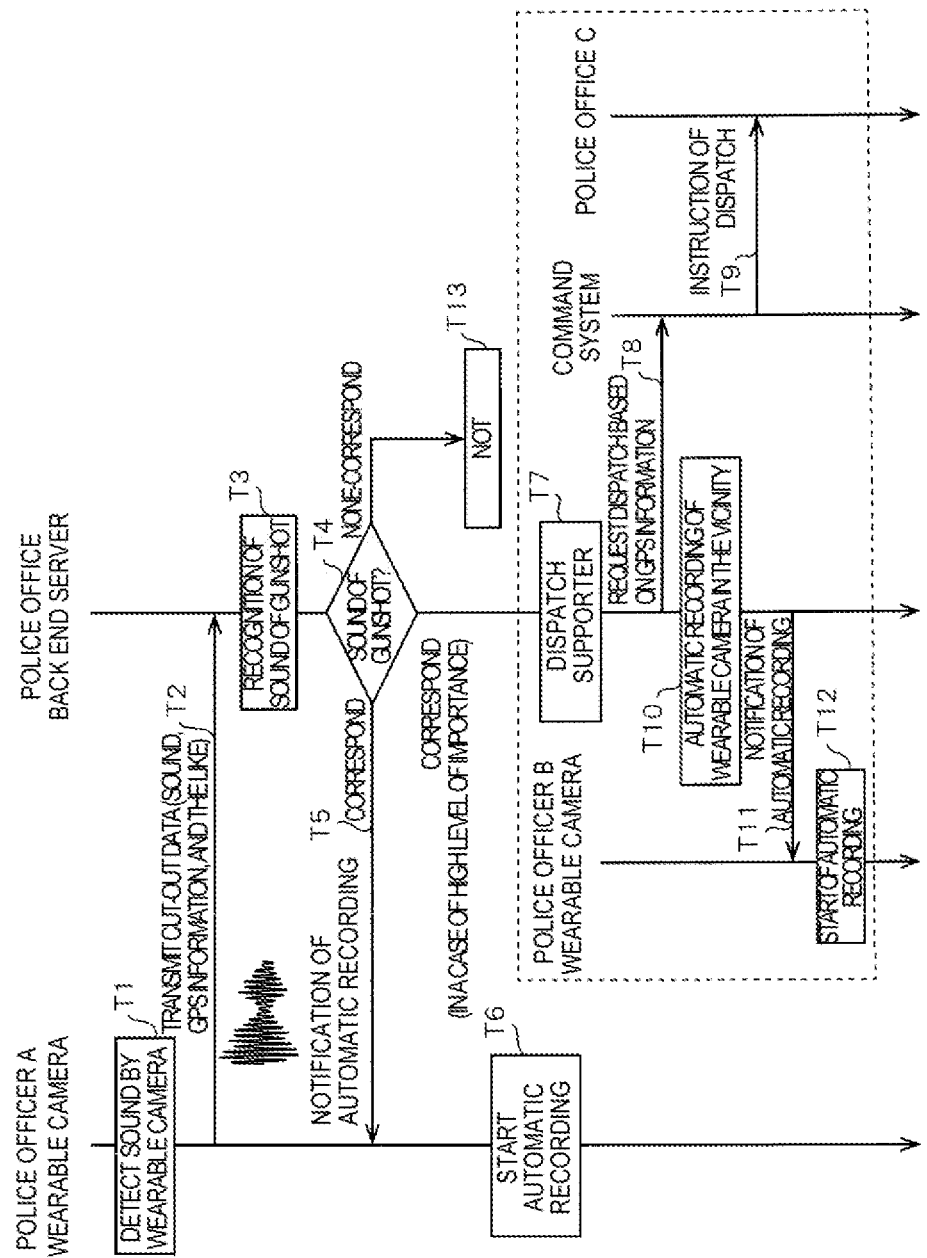
FIG. 7 is a sequence diagram illustrating an example of automatic recording procedure in the wearable camera system of the first exemplary embodiment.

FIG. 7 is a sequence diagram illustrating an example of automatic recording procedure in wearable camera system 5 of the first exemplary embodiment. Here, the police officers are distinguished as an individual person such that police officer 3 who is in patrol is set to be police officer A, police officer 3 who has rushed to the site in response to a dispatch instruction is set to be police officer B, and police officer 3 who has received an additional dispatch instruction is set to be police officer C.

Wearable camera 10 continuously captures images or collects the sounds the vicinity while police officer A having a wearable camera 10 mounted on a uniform or carrying a wearable camera 10 gets off from patrol car 7, and patrols around the area. Detector 19z in MCU 19 detects the sounds collected by microphone 29A, and then generates audio data by cutting out a section of the detected sound (T1).

Figure 8A:
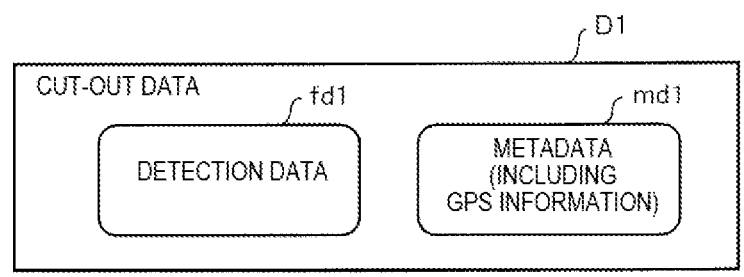
FIG. 8A is a diagram illustrating a configuration of cut-out data of the exemplary embodiments.

FIG. 8A is a diagram illustrating a configuration example of cut-out data D1. Cut-out data D1 includes detection data fd1 and metadata md1. Detection data fd1 includes the audio data obtained by cutting out the section of the sound among audio signal waveforms obtained by collecting sounds by microphone 29A. Metadata md1 includes the position information (GPS information) obtained by GPS receiver 18. Metadata md1 also may include information on the current date and time measured by RTC 17.

MCU 19 transmits the cut-out data to back end server 50 via communicator 21 (T2).

In back end server 50, communicator 53 receives the cut-out data transmitted from wearable camera 10. CPU 51 recognizes the sound (for example, gunshot) from the audio data included in the cut-out data by recognizer 51z (T3). CPU 51 searches audio database 58z stored in storage 58 based on the recognized sound, and determines whether or not the recognized sound corresponds to the sound (gunshot) registered in audio database 58z (T4). Here, the sound of gunshot is exemplified as one example of the corresponding sound; however, examples of the corresponding sound may include the input sound, the sound when the police officer is fell down, the impact sound, and an explosion sound.

In a case where the recognized sound corresponds to the sound registered in audio database 58z, CPU 51 regards this as a trigger of the start of recording, and notifies wearable camera 10 of the automatic start of the recording (that is, instruction to start the recording) via communicator 53 as one example of a notifier (T5). The notification includes notification information. The notification information includes, for example, information on the sound source (name and performance of the sound source) such as the sound of the gunshot and the explosion sound in addition to the aforementioned instruction to start the recording.

When wearable camera 10 receives the notification data of the automatic start of the recording from back end server 50 via communicator 21, MCU 19 starts the automatic recording as a process after notification (T6). Capture 11 constantly captures videos while the power of wearable camera 10 is turned on. MCU 19 stores the video captured by capture 11 in storage 15 when the automatic recording is started.

When receive the notification data, MCU 19 may start streaming distribution in which the video data of a video captured by capture 11 is transmitted to back end server 50 via streaming proxy server 65. Back end server 50 displays the video captured by wearable camera 10 on the screen of display 56 in real-time.

In procedure T4, in a case of an emergency situation, for example, a case where multiple sounds of the gunshot are recognized, a case where the explosion sound is recognized in addition to the sound of the gunshot, and a case where the sound when the police officer is fell down is recognized, wearable camera system 5 performs the operations in procedures T5 and T6 as described above, and additionally performs the following operations.

Back end server 50 determines the additional dispatch in accordance with the instruction of police officer 3 in police office 4 (T7). Back end server 50 requests for the dispatch from command system 90 based on the position information included in the metadata transmitted from wearable camera 10 (T8). When receiving the request of the dispatch from back end server 50, command system 90 instructs police officer C to be dispatched (T9). Police officer C rushes to the site of the incident when receiving the instruction of the dispatch.

Figure 8B:
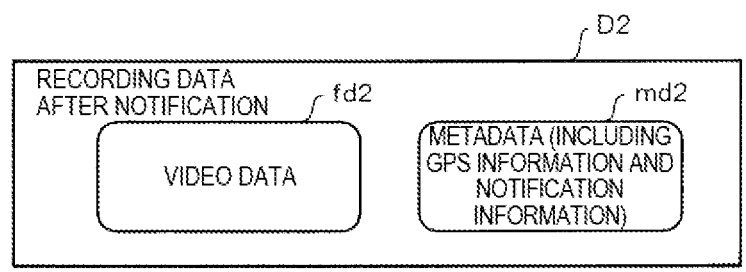
FIG. 8B is a diagram illustrating a configuration of recording data after notification of the exemplary embodiments.

Back end server 50 determines automatic recording of wearable camera 10 in the vicinity of the site so as to obtain the video in which the vicinity of the site (T10), and notifies wearable camera 10 belonging to police officer B in the vicinity of the site of the automatic recording (T11). When wearable camera 10 which is mounted on the uniform of police officer B receives the aforementioned notification, MCU 19 starts the operation of recording the video captured by capture 11 and the sound collected by microphone 29A in storage 15 (T12). FIG. 8B is a diagram illustrating a configuration of recording data D2 after notification. Recording data D2 after notification includes video data fd2 and metadata md2 corresponding to video data fd2. Metadata md2 includes the GPS position information and notification information (the information on the sound source).

Wearable camera 10 performs the recording from before a predetermined time (for example, ten minutes) for receiving the notification data. That is, the video captured by the wearable camera 10 is recorded so as to be repeatedly overwritten in a buffer memory of RAM 13 for a predetermined period of time. When receiving the notification data transmitted from back end server 50, wearable camera 10 uses the video data before being stored in the buffer memory for the predetermined period of time as an initial part of the recording data after notification. With this, wearable camera 10 can reliably record the video before and after situations in which the sound of the gunshot is generated, and the video can be more valuable as an evidence video in which a person who shoots a gun is captured. The predetermined time is optionally set by the operation of police officer 3.

In procedure T4, in a case where the recognized sound does not correspond to the sound registered in audio database 58z, wearable camera 10 does not perform any operation (T13).

As described above, wearable camera system 5 in the first exemplary embodiment, detector 19z in MCU 19 of wearable camera 10 cuts out the section of the sounds collected by microphone 29A so as to generate the audio data. Communicator 21 transmits the generated audio data to back end server 50. Back end server 50 receives the audio data from wearable camera 10. CPU 51 collates the received audio data with the audio data registered in audio database 58z. As the result of the collation, in a case where the received audio data and the registered audio data are matched with each other, communicator 53 notifies wearable camera 10 of the automatic start of the recording. In a case where wearable camera 10 is notified of the automatic start of the recording, the recording of the video captured by capture 11 is started.

With this, when the incident happens, wearable camera system 5 can starts the recording the video captured by wearable camera 10 without the operation performed by the police officer. Accordingly, even in a case where the police officer who is in a hurry to correspond to the occurrence of the incident cannot afford to press the recoding switch of wearable camera 10, or forgets to press the recoding switch due to a sudden situation, it is possible to obtain the video capturing the site of the incident, and prevents the recording from being missed. Therefore, wearable camera system 5 can obtain the video of the incident site, and thus efficiently assist police officers with their services such that the district police office can take quick and appropriate actions for the occurrence of the incident. In addition, the video of the incident site remains as the evidence video, a smooth operation is expected in resolution of the incident, a trial, or the like.

Since the sounds collected by microphone 29A of wearable camera 10 is the sound of the gunshot, it is possible to record the video of the site in which a shoot incident happens.

Second Exemplary Embodiment

In the first exemplary embodiment, the case where the wearable camera is usually connected to the back end server of the police office via the network is described; however, in the second exemplary embodiment, a case where the wearable camera is not connected to the network in general will be described. In this case, a police officer in the outside of the police office and a police officer in the police office make a call using a radio wave.

The wearable camera system in the second exemplary embodiment has almost the same configuration as that of the first exemplary embodiment. The same components as those in the first exemplary embodiment are denoted by the same reference numerals, and thus the description thereof will be omitted.

Figure 9:
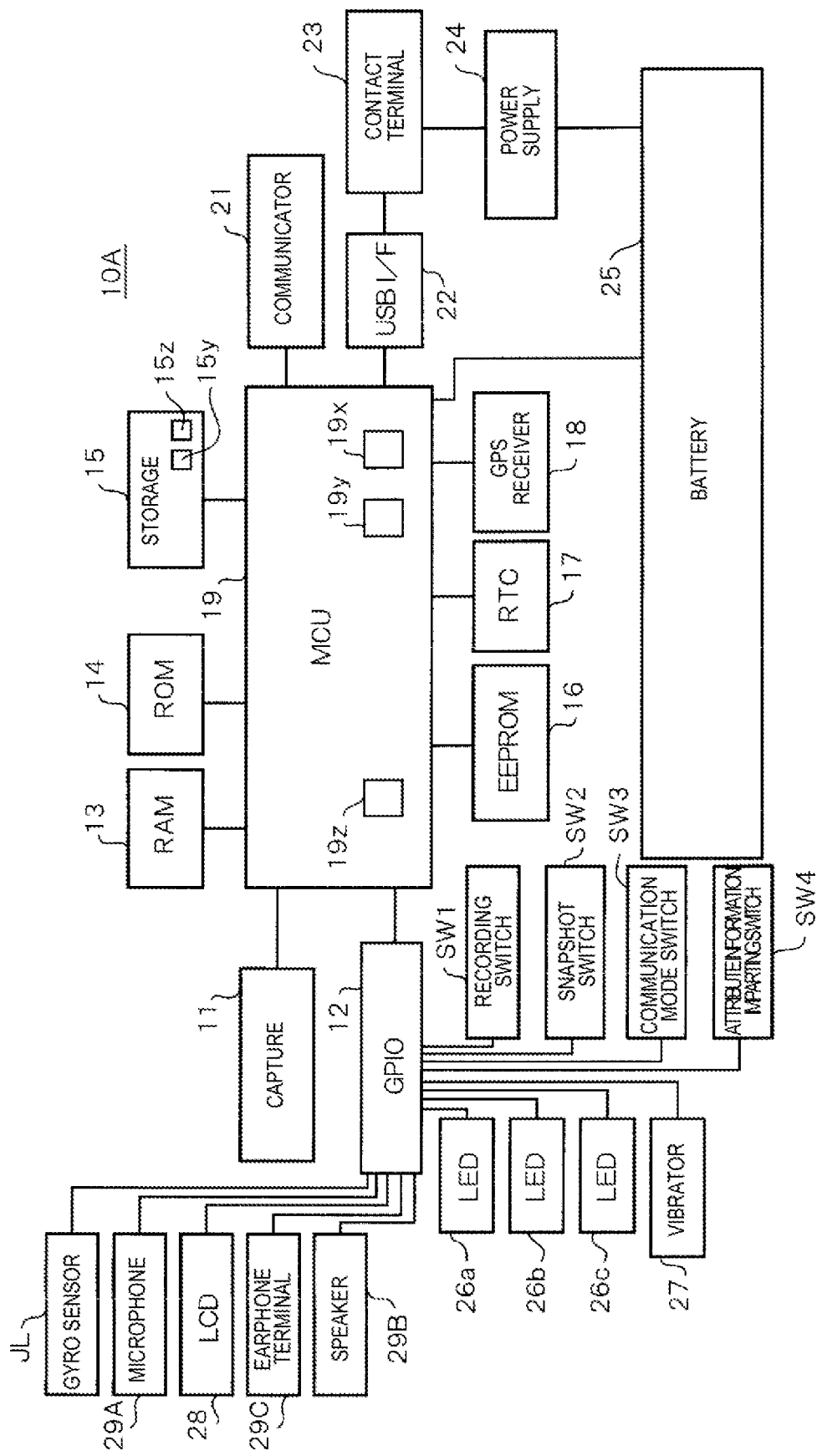
FIG. 9 is a block diagram illustrating an example of an internal configuration of a wearable camera of a second exemplary embodiment.

FIG. 9 is a block diagram illustrating an example of an internal configuration of wearable camera 10A of the second exemplary embodiment. In wearable camera 10A, storage 15 includes audio database 15y in which the predetermined audio data during the patrol or relating to the incident is registered, which is the same as audio database 58z in the first exemplary embodiment. Similar to the first exemplary embodiment, the predetermined audio data includes the audio data such as the sound of the gunshot, the input sound, and the sound when the police officer is fell down on the ground or the like (for example, "with a dull thud").

MCU 19 includes recognizer 19y which can be realized by execution of an application program, and performs collation of sounds based on the audio data generated by detector 19z. Recognizer 19y analyzes the input audio data, extracts the features, and collates the extracted features with the features of the audio data registered in audio database 15y so as to determine whether or not the items of audio data are matched with each other.

MCU 19 includes authenticator 19x which can be realized by execution of an application program, and authenticates police officer 3. Authenticator 19x registers authentication data of police officer 3 carrying wearable camera 10 in storage 15 in advance, and in a case where the input data and the authentication data are matched with each other, allows police officer 3 to use wearable camera 10. On the other hand, in a case where the input data and the authentication data are not matched with each other, authenticator 19x does not allow police officer 3 to use wearable camera 10.

Examples of the authentication data include an identification code of police officer 3, and when police officer 3 logs in wearable camera 10, authentication is performed. Further, iris data, input audio data, or face recognition data of police officer 3, or combination thereof may be used as the authentication data, and when police officer 3 logs in wearable camera 10, the authentication is performed. When the authentication of the police officer is performed, the police officer and the wearable camera are linked with each other. Accordingly, others cannot use the wearable camera. As such, it is possible to simply authenticate the police officer by only using the wearable camera, the convenience is enhanced.

Figure 10:
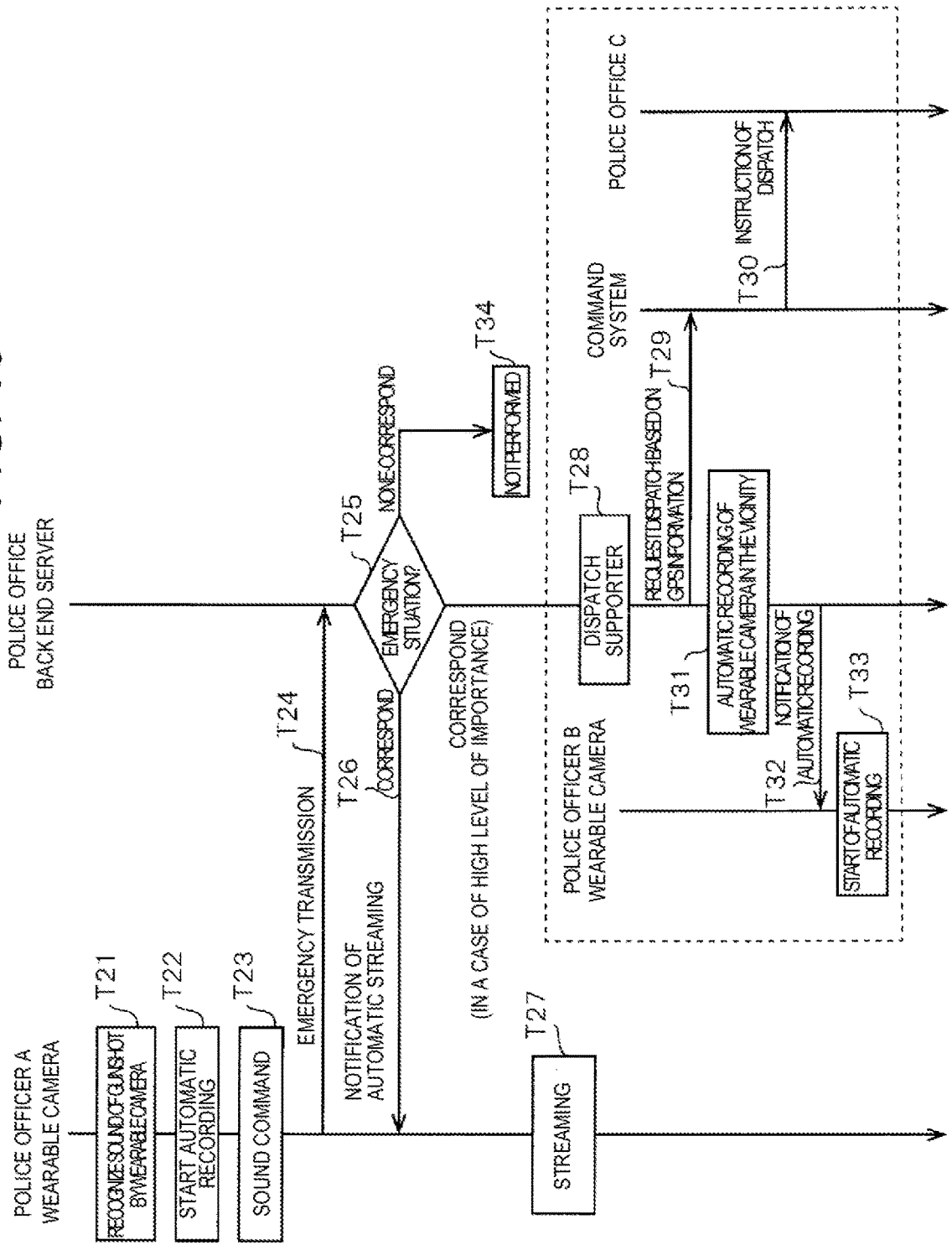
FIG. 10 is a sequence diagram illustrating an example of automatic recording procedure in the wearable camera system of the second exemplary embodiment.

FIG. 10 is a sequence diagram illustrating an example of automatic recording procedure in wearable camera system 5 of the second exemplary embodiment. Wearable camera 10 continuously captures images or collects the sounds the vicinity while police officer A gets off from patrol car 7, and patrols around the area. Detector 19z in MCU 19 detects the sound collected by microphone 29A, and then generates audio data by cutting out a section of the detected sound. Further, recognizer 19y in MCU 19 recognizes a sound (for example, a sound of gunshot) from the generated audio data (T21).

MCU 19 searches audio database 15y based on the recognized sound, and determines whether or not the recognized sound corresponds to the sound (gunshot) registered in audio database 15y. Here, the sound of gunshot is exemplified as one example of the corresponding sound; however, examples of the corresponding sound may include the input sound, the sound when the police officer is fell down, and an explosion sound.

In a case where the recognized sound corresponds to the sound registered in audio database 15y, MCU19 starts the automatic start of the recording of wearable camera 10 (T22). In addition, when the automatic recording is started, MCU 19 is connected to the wireless network via communicator 21 so as to realize the wireless communication with back end server 50. A method of connecting to the wireless network is the same as that in the first exemplary embodiment. On the other hand, in a case where the recognized sound does not correspond to the sound registered in audio database 15y, MCU 19 does not perform any operation.

During the recording, when the sounds are collected by microphone 29A, and the audio data is generated by detector 19z (T23), MCU 19 transmits the generated audio data to back end server 50 via communicator 21 (T24). Note that, in an emergency case, instead of transmitting the audio data, emergency information may be transmitted by pressing an emergency button so as to clearly notify the emergency case. The emergency button may be separately disposed in the housing of the wearable camera; however, in the exemplary embodiment, the emergency case can be informed by pressing recording switch SW1 twice in succession.

CPU 51 searches audio database 58z stored in storage 58 based on the received sound, and determines whether or not the recognized sound corresponds to the sound of the emergency situation registered in audio database 58z (T25). Here, examples of the sound of the emergency situation include the sound of the gunshot; however, examples of the corresponding sound may include the input sound, the sound when the police officer is fell down, and an explosion sound, and may further include multiple sounds of the gunshot or the explosion sound with the sound of the gunshot which is determined as a case of an emergency situation. In a case where the emergency button is pressed, CUP 51 is required to determine that the emergency situation has occurred.

In a case where the recognized sound corresponds to the sound registered in audio database 58z, CPU 51 notifies wearable camera 10 of the automatic start of streaming via communicator 53 as one example of a notifier (T26).

When wearable camera 10 receives the notification data of the automatic start of the streaming from back end server 50 via communicator 21, MCU 19 starts the automatic start of the streaming as a process after notification (T27). Here, MCU 19 performs streaming distribution of the video data to back end server 50 via streaming proxy server 65 while recording the video data of the video captured by capture 11 in storage 15. With this, back end server 50 displays the video captured by wearable camera 10 on the screen of display 56 in real-time.

In procedure T25, in a case of an emergency situation, for example, a case where multiple sounds of the gunshot are recognized, a case where the explosion sound is recognized in addition to the sound of the gunshot, and a case where the sound when the police officer is fell down is followed by the sound of the gunshot, wearable camera system 5 performs the operations in procedures T26 and T27 as described above, and additionally performs the following operations, similar to the first exemplary embodiment.

Back end server 50 determines the additional dispatch in accordance with the instruction of police officer 3 in police office 4 (T28). Back end server 50 requests for the dispatch from command system 90 based on the position information included in the metadata transmitted from wearable camera 10 (T29). When receiving the request of the dispatch from back end server 50, command system 90 instructs police officer C to be dispatched (T20). Police officer C rushes to the site of the incident when receiving the instruction of the dispatch.

Back end server 50 determines automatic recording of wearable camera 10 in the vicinity of the site so as to obtain the video in which the vicinity of the site (T31), and notifies wearable camera 10 belonging to police officer B in the vicinity of the site of the automatic recording (T32). When wearable camera 10 which is mounted on the uniform of police officer B receives the aforementioned notification, MCU 19 starts the operation of recording the video captured by capture 11 and the sound collected by microphone 29A in storage 15 (T33).

In procedure T25, in a case where the recognized sound does not correspond to the sound registered in audio database 58z, wearable camera 10 does not perform any operation (T34).

As described above, wearable camera system 5 in the second exemplary embodiment, audio database 58z registers the audio data of the sounds emitted in the emergency situation as the predetermined audio data. In a case where the audio data received from wearable camera 10 and the registered audio data are matched with each other, back end server 50 instructs wearable camera 10 to perform the streaming distribution of the video captured by capture 11. Wearable camera 10 starts the streaming distribution of the video captured by capture 11 in accordance with an instruction from back end server 50.

With this, in wearable camera system 5, in the case where the sound of the emergency situation is emitted, the police officer in the police office grasps the situation of the incident site by watching the video captured by the wearable camera, and thus can take appropriate actions.

Wearable camera 10 transmits the emergency information to back end server 50 in a case where recording switch SW1 is pressed twice in succession as an emergency button which is operated in the emergency situation. Back end server 50 instructs wearable camera 10 to perform the streaming distribution of the video captured by capture 11 when the emergency information is received from wearable camera 10. Wearable camera 10 starts distribution of the video captured by capture 11 in accordance with an instruction from back end server 50.

With this, it is possible to clearly notify the emergency case. In addition, when the police officer presses the emergency button in person, it is possible to reflect intention of the police officer. The police officer in the police office can grasp the situation of the incident site by watching the video captured by the wearable camera, and thus can take an appropriate action.

Modification Example 1 of First Exemplary Embodiment

In the first exemplary embodiment, back end server 50 notifies wearable camera 10 of the automatic start of the recording, and when receiving this notification data, wearable camera 10 starts the automatic recording; however, in Modification example 1 of the first exemplary embodiment (hereinafter, referred to as Modification example 1), command system 90 notifies wearable camera 10 of the automatic start of the recording.

FIG. 11A is a diagram illustrating automatic recording in Modification example 1. Wearable camera 10 is connected to a mobile line, and can realize mobile communication with respect to command system 90. Command system 90 receives GPS information of wearable camera 10 via the mobile communication. In a case where a serious incident happens in the vicinity, command system 90 notifies wearable camera 10 of the automatic start of the recording, based on the GPS information (T41). Further, in a case where the occurrence of a serious incident is notified, command system 90 notifies wearable camera 10 of the automatic start of the recording even in a case where a serious criminal's face is already recognized. When receiving the notification of the automatic start of the recording, wearable camera 10 starts the automatic recording (T42).

Note that, when back end server 50 receives the emergency information from wearable camera 10, and notifies command system 90 of the emergency information, command system 90 may notify wearable camera 10 of the automatic start of the recording.

Modification Example 2 of First Exemplary Embodiment

Modification example 2 of the first exemplary embodiment (hereinafter, referred to as Modification example 2) describes a case where command system 90 notifies wearable camera 10 of the automatic start of the recording via an on-vehicle PC, a tablet, or a smart phone (hereinafter, referred to as a mobile terminal) which is belongs to the police officer. Note that, command system 90 may notify on-vehicle PC 32 of on-vehicle camera system 30 of the automatic start of the recording in addition to the aforementioned mobile terminal such as the tablet and the smart phone. In this case, on-vehicle PC 32 can instruct wearable camera 10 to perform the automatic start of the recording.

FIG. 11B is a diagram illustrating automatic recording in Modification example 2. Wearable camera 10 can communicate with the mobile terminal. This type of communication is performed via a USB cable, Bluetooth (trade mark), near field communication, or the like.

In a case of an emergency call (110), command system 90 determines an instruction the police officer in the vicinity to rush to the site (T51), and transmits the instruction to the mobile terminal such that the police officer rushes to the site (T52). In a case of receiving the instruction from command system 90 such that the police officer rushes to the site, the mobile terminal notifies wearable camera 10 of the automatic start of the recording (T53). Note that, when receiving the notification of the occurrence of the serious incident, the mobile terminal notifies wearable camera 10 of the automatic start of the recording even in a case where a serious criminal's face is already recognized. When receiving the notification of the automatic start of the recording, wearable camera 10 starts the automatic recording (T54).

In Modification example 2, wearable camera 10 is connected to the mobile terminal, and thus is not necessarily connected to the mobile line. Accordingly, as compared with the case of Modification example 1 which is usually connected to the mobile line, the wearable camera in Modification example 2 can reduce the battery drain, and thus can be used for a long time of period.

When back end server 50 receives the emergency information from wearable camera 10, and notifies command system 90 of the received emergency information, command system 90 may notify wearable camera 10 of the automatic start of the recording via the mobile terminal.

Although various embodiments have been described with reference to the accompanying drawings, it is to be understood that the present disclosure is not limited thereto. It is obvious that those skilled in the art can conceive various changes and modifications within the scope described in the claims, and it is understood that the aforementioned various changes and modifications naturally belong to the technical scope of the present disclosure.

For example, in the above-described embodiment, the case where the wearable camera starts the automatic recording when the predetermined sounds are collected is described; however, the automatic recording may be started even in other cases in addition to the case where the sounds collected by the microphone correspond to the predetermined sound. For example, when the police officer who is charging the wearable camera by using a charging cable in the patrol car 7 encounters an incident such as fire or injury, in a case where the police officer rushes out of the patrol with the wearable camera, that is, in a case where the charging cable is disconnected from the wearable camera without an operation of detaching, the wearable camera may start the automatic recording by regarding the disconnection of the charging cable as a trigger. In the case of the emergency, the recording is started even when the police officer just gets out of the patrol car with the wearable camera so as to rapidly take an action.

In addition, in the above-described embodiment, as one example of a method of collating the audio data, a method of collating audio data included in the cut-out data transmitted from the wearable camera 10 with the audio data registered in audio database 58*z* of back end server 50, that is a collating method of determining whether or not the items of audio data are matched with each other (or similar to each other) as a signal waveform of the audio data is described. However, the method of collating the audio data is not limited to the method of determining whether or not the items of audio data are matched with each other (or similar to each other) as a signal waveform of the audio data. Back end server 50 may convert the audio data included in the cut-out data transmitted from wearable camera 10 into text data through the sound recognition, and then collate whether or not the converted text data is matched (similar to) with text data corresponding to the audio data registered in audio database 58*z*. With this, back end server 50 can easily determine whether or not the audio data included in the cut-out data transmitted from wearable camera 10 is matched with the audio data registered in audio database 58*z* by using the text data.

What is claimed is:

1. A wearable camera connectable to an external server, the wearable camera comprising:
 a capture, which, in operation, captures a video of a subject;
 a recorder, which, in operation, records the video of the subject;
 a microphone, which, in operation, collects sounds; and
 a controller, which, in operation, determines whether or not the sounds collected by the microphone is a predetermined sound, wherein
 in a case where the sounds collected by the microphone is the predetermined sound, the controller starts the recording of the video of the subject, generates sound data based on the sounds collected by the microphone, and transmits the sound data to the external server,
 in response to the sound data being received by the external server, the external server determines whether or not the sound data corresponds to an emergency situation,
 the external server determines the sound data corresponds to the emergency situation in a case where the sound data and a sound stored in a storage of the external server correspond with each other,
 in a case where the external server determines the sound data corresponds to the emergency situation, the external server transmits a notification to the wearable camera, and
 the controller streams the video of the subject to the external server in response to the notification being received by the wearable camera.

2. The wearable camera of claim 1, wherein the wearable camera and the external server communicate with each other via wireless network.

3. The wearable camera of claim 1, further comprising:
 an emergency button,
 wherein in a case where the emergency button is pressed, communication with the external server is immediately started.

4. The wearable camera of claim 1, wherein the video of the subject is displayable at the external server.

5. The wearable camera of claim 1, wherein the controller performs an emergency transmission to the external server in the case where the sounds collected by the microphone and the predetermined sound correspond with each other.

6. The wearable camera of claim 1, wherein the controller generates the sound data by cutting out a section of the sounds collected by the microphone.

7. The wearable camera of claim 1, wherein the sound stored in the storage of the external server is at least one of a sound of a gunshot, a sound of a person falling down, or a sound an explosion.

8. The wearable camera of claim 1, wherein the video of the subject is streamed in real-time.

9. The wearable camera of claim 1, further comprising:
a storage that stores the predetermined sound.

10. The wearable camera of claim 9, wherein the predetermined sound is at least one of a sound of a gunshot, a sound of a person with the wearable camera falling down, or an explosion sound.

11. The wearable camera of claim 9, wherein the controller generates the sound data by cutting out a section of the sounds collected by the microphone, and collates the sound data with the predetermined sound stored in the storage.

12. The wearable camera of claim 1, wherein in a case where the external server determines the sound data does not correspond to the emergency situation, the controller does not stream the video of the subject to the external server.

13. A method for a wearable camera connectable to an external server,
the wearable camera including
a capture that captures a video of a subject,
a recorder that records the video of the subject,
a microphone that collects sounds, and
a controller,
the method comprising:
determining, by the controller, whether or not the sounds collected by the microphone is a predetermined sound;
in a case where the sounds collected by the microphone is the predetermined sound, starting, by the controller, the recording of the video of the subject, generating, by the controller, sound data based on the sounds collected by the microphone, and transmitting, by the controller, the sound data to the external server;
in response to the sound data being received by the external server, determining, by the external server, whether or not the sound data corresponds to an emergency situation, the external server determining the sound data corresponds to the emergency situation in a case where the sound data and a sound stored in a storage of the external server correspond with each other;
in a case where the external server determines the sound data corresponds to the emergency situation, transmitting, by the external server, a notification to the wearable camera; and
streaming, by the controller, the video of the subject to the external server in response to the notification being received by the wearable camera.

* * * * *